United States Patent [19]
Mueller

[11] Patent Number: 6,125,524
[45] Date of Patent: *Oct. 3, 2000

[54] RIVETABLE ELEMENT, ASSEMBLY, METHOD OF ASSEMBLY AND RIVETING DIE

[75] Inventor: Rudolf R. M. Mueller, Frankfurt, Germany

[73] Assignee: Multifastener Corporation, Detroit, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/704,581

[22] PCT Filed: Mar. 22, 1995

[86] PCT No.: PCT/US95/03507

§ 371 Date: Dec. 30, 1996

§ 102(e) Date: Dec. 30, 1996

[87] PCT Pub. No.: WO95/26256

PCT Pub. Date: Oct. 5, 1995

[30] Foreign Application Priority Data

Mar. 25, 1995 [DE] Germany ............... P 44 10 475

[51] Int. Cl.[7] ..................................................... B23P 11/00
[52] U.S. Cl. ............................. 29/520; 29/515; 403/242; 403/282; 411/180; 411/188
[58] Field of Search ............................. 29/515, 520, 243, 29/243.519; 411/176, 184, 188, 955, 180; 403/242, 282; 72/414

[56] References Cited

U.S. PATENT DOCUMENTS

| | | |
|---|---|---|
| 145,702 | 12/1873 | Weeden ................... 72/414 X |
| 1,849,669 | 3/1932 | Glasner et al. ........... 72/414 X |
| 2,177,191 | 10/1939 | Sandberg . |
| 2,395,063 | 2/1946 | Paulus . |
| 2,713,277 | 7/1955 | Kaul ......................... 72/414 X |
| 2,749,606 | 6/1956 | Donahue . |
| 3,127,919 | 4/1964 | Swanstrom . |
| 3,187,424 | 6/1965 | Double et al. . |
| 3,187,427 | 6/1965 | Double . |
| 3,337,946 | 8/1967 | Anderson et al. . |
| 3,506,050 | 4/1970 | Pouch et al. . |

(List continued on next page.)

FOREIGN PATENT DOCUMENTS

| | | |
|---|---|---|
| 97994 | 5/1964 | Denmark ................. 72/414 |
| 30166929 | 5/1985 | European Pat. Off. . |
| 304598 | 3/1903 | France . |
| 3133638A1 | 3/1983 | Germany . |
| 82250782 U | 2/1984 | Germany . |
| 0128338 | 10/1980 | Japan ....................... 72/414 |

Primary Examiner—P. W. Echols
Attorney, Agent, or Firm—Howard & Howard

[57] ABSTRACT

The present invention relates to a rivetable element or fastener which comprises a shaft or barrel portion and an integral head portion which can be permanently affixed in a sheet metal part or panel by riveting, an assembly comprising a sheet metal part or panel and the riveting element, a method for the manufacture of the assembly, and a die specifically designed for forming the fastener and panel assembly. The underside of the head portion adjacent the shaft or barrel portion includes an out annular contact surface and an inner riveting portion which includes a plurality of spaced shallow pocket or closed fields which entrap the panel metal during installation. The shaft or barrel portion includes at least one depression based from the plane of the contact surface which, in the preferred embodiment, comprises a spiral thread. The riveting die includes a central opening which receives the shaft or barrel portion and a crown area, surrounding the opening, which preferably includes projecting peaks and concave surfaces which deform the sheet metal part or panel into the pockets in the head portion and radially inwardly into the depression on the shaft or barrel portion, forming a secure fastener and panel assembly.

32 Claims, 5 Drawing Sheets

U.S. PATENT DOCUMENTS

| | | |
|---|---|---|
| 3,699,637 | 10/1972 | Rosiek . |
| 3,770,037 | 11/1973 | Ernest . |
| 3,820,579 | 6/1974 | Barry . |
| 3,878,598 | 4/1975 | Steward . |
| 3,922,050 | 11/1975 | Lettini et al. . |
| 3,967,669 | 7/1976 | Egner . |
| 4,525,912 | 7/1985 | Kazino et al. . |
| 4,543,023 | 9/1985 | Capuano . |
| 4,574,473 | 3/1986 | Sawdon . |
| 4,637,766 | 1/1987 | Milliser ................................. 411/180 |
| 4,808,050 | 2/1989 | Landt . |
| 4,966,512 | 10/1990 | Takaku . |
| 5,251,370 | 10/1993 | Muller et al. . |

RIVETABLE ELEMENT, ASSEMBLY, METHOD OF ASSEMBLY AND RIVETING DIE

FIELD OF THE INVENTION

This invention relates to self-riveting elements or fasteners, such as screws, bolts, nuts and the like, wherein the rivetable element includes a shaft or barrel portion and an integral head portion having a riveting portion on the underside of the head portion, adjacent the shaft or barrel portion. The field of this invention also relates to riveting dies having a central opening which receives the shaft or barrel portion of the riveting element and a riveting portion adjacent the opening which deforms the sheet metal part or panel to which the riveting element is attached into the riveting portion of the fastener head. Finally, the field of this invention relates to methods of attaching riveting elements of the type described to a sheet metal part or plastically deformable panel.

RELATED APPLICATIONS

This application claims priority to German patent application P 44 10 475.8 filed Mar. 25, 1994.

BACKGROUND OF THE INVENTION

As described, the present invention relates to improved self-riveting elements or fasteners having a shaft or barrel portion and an integral head portion which may be permanently affixed to a sheet metal part or panel by riveting. Elements of this type are previously known, wherein the shaft is generally threaded and introduced in a pre-formed hole in the sheet metal part. The head portion then bears on one side of the metal part. The sheet metal part or panel is then shaped in a setting operation, such that the panel molds physically into a small groove in the shaft of the element, directly adjacent the bearing surface on the underside of the head portion, thereby securing the element in a sheet metal part or panel. The underside of the head, adjacent the shaft, may include radial ribs and the panel is deformed over the ribs during installation, preventing relative rotation of the elements on the sheet metal panel. Such assemblies are frequently used in industrial production by the automotive and appliance industries to fasten another component to the assembly, which may consist of a second sheet metal part and fastener, such as a nut. The contact surface of the head portion is thus located on one side of the first panel, opposite the second fastening element, such that the sheet metal part is stressed by compression between the fasteners.

In practice, however, the previously known self-riveting elements of this type were not securely attached to the metal part, such that the element commonly loosened in shipping or storage before assembly, particularly where the sheet metal part is relatively thin as now used by the automotive and appliance industries. It is not uncommon for the riveting element to become lost or assume an orientation in the panel which is unacceptable for further processing of the sheet metal part, as described above. The loosening of the prior self-riveting elements of this type also sometimes resulted in inefficiency of the intended anti-rotation means, such that the element will rotate as the nut is assembled on the shaft portion, before the nut is tightened on the bolt. These difficulties are a particular problem in automotive body construction and other applications where the head portion of the riveting elements are located in an enclosed cavity following installation, which is no longer accessible for repair. If the fastening element freely rotates in the panel or is lost under these conditions, the object being manufactured, such as an automobile, can no longer be finished in regular production, but must be repaired at substantial expense. Obviously, these problems should be avoided, if possible.

Another problem, particularly with attaching a riveting fastener to thin sheet metal panels results from the fact that the anti-rotation ribs must have a certain height; that is, the height of the ribs from the contact surface on the underside of the head portion must be sufficient to prevent rotation. Where the sheet metal part is relatively thin, the ribs dent the panel to a degree such that the full strength of the sheet metal part is no longer available, which may lead to further problems.

Another disadvantage of self-riveting male fastener elements of this type is that the small groove in the shaft portion which receives the panel material to prevent pull-out is difficult to make and thus unnecessarily increases the cost of the fastener. Further, this radial groove results in an undesirable reduction in the strength of the bolt or screw fastener, including its fatigue properties, resulting from the sharp edges and reduction of the cross-sectional area of the shaft portion of the element. Further, because of the groove dimensions, the element may also be insufficiently secured to the sheet metal part, aggravating the tendency of the element to loosen in the sheet metal part or drop out, as described above.

Thus, a primary object of the present invention is to provide a self-riveting element of this type which can be manufactured and fixed to the sheet metal panel at a relatively low cost and wherein the risk of loosening or loss of the element out of the sheet metal part is reduced and preferably precluded. Another object is to provide a joint between the self-riveting element and panel which is as strong as possible and a self-riveting element or fastener which is suitable for attachment to thin sheet metal parts, including nonferrous sheet metal parts, such as aluminum or its alloys.

SUMMARY OF THE INVENTION

The self-riveting element or fastener of this invention includes several inventive features or elements which, in combination, result in an improved element and fastener and panel assembly, and reduces the cost of the assembly. As will be understood, however, the inventive features of this invention may also be used separately, particularly where the function of a particular feature is desired or the function of another feature is not desired. As described above, the self-riveting element or fastener of this invention includes a shaft or barrel portion and an integral head portion which extends generally transverse to the longitudinal axis of the shaft or barrel portion and which provides an annular contact surface on the underside of the head portion adjacent the shaft or barrel portion. In the preferred embodiment, the contact surface includes a plurality of concave pockets or closed fields which are bounded by ribs extending outwardly away from the shaft portion. In the most preferred embodiment, the pockets include a bottom wall which extends radially inwardly toward the shaft portion and the ribs between the pockets extend longitudinally along the shaft portion. In the most preferred embodiment, the shaft portion further includes at least one radial depression or groove which is spaced from the plane of the contact surface of the head portion, preferably a distance equal to approximately the thickness of the sheet metal part or panel to which the riveting element is attached. This depression or groove most preferably extends spirally around the shaft portion and may be the groove of the first thread where the shaft or barrel portion is threaded.

This design makes it possible in riveting the element or fastener to the sheet metal part or panel to plastically deform the material of the sheet metal part by a suitable die arranged concentrically to the shaft into the concave, peripherally closed fields or pockets in the underside of the head portion and radially into the depression or groove in the shaft portion with essentially no thinning of the sheet metal part. Further, the self-riveting element or fastener of this invention prevents rotation of the fastener in the panel without weakening of the sheet metal part, thus avoiding the problems associated with the projecting radial ribs on conventional self-riveting elements of this type. Further, because the ribs between the concave pockets extend longitudinally along the shaft portion, the anti-rotation is achieved not only through the material driven into the concave fields, but also by the positive connection between the longitudinal ribs on the shaft portion and the sheet metal part. As a result, the torque resistance of the fastener in the panel is considerably improved. In attaching the element to the panel, the sheet metal part is not unnecessarily reduced in thickness and the depression or groove in the shaft portion may be located further away from the underside of the contact surface of the head than would be possible with the radial groove according to the prior art, such that the depression can be more easily formed. Further, the shape of the depression or groove can be formed more cleanly than where the groove is located immediately adjacent the head as in the prior art, insuring that the sheet metal will be more fully deformed into the depression, thereby generating an improved resistance to push-off of the fastener and loss of the element from the sheet metal part, as described above.

Another advantage of the self-riveting fastener element of this invention is the location of the longitudinal ribs and the radial depression or groove on an enlarged portion of the shaft adjacent the head. Owing to this design, the self-riveting element is weakened less by the depression, allowing a more full utilization of the rated strength of the fastener element and an improvement of the fatigue properties of the element. Further, the torque resistance of the element in the panel is also improved. Of special importance, however, is that the flow performance of the sheet metal part material can be improved in the attachment of the fastener to the panel. Preferably, the preformed or prefabricated hole in the sheet metal part has a diameter which enables the insertion of the shaft portion without damage. The large diameter portion of the shaft portion preferably has a diameter which is slightly greater than the opening or hole in the panel, such that the diameter of the hole is enlarged during installation of the self-riveting element in the panel, which provides additional material which can be driven into the concave, peripherally closed fields or pockets in the head and into the radial depression in the shaft portion. It is also possible to conically deform the sheet metal part adjacent the hole in accordance with the disclosure of U.S. co-pending application Ser. No. 343,724 filed Nov. 22, 1994 now U.S. Pat. No. 5,528,812, the disclosure of which is incorporated herein by reference. The shaft or barrel portion of the self-riveting element is then received through the conical opening, through the apex of the conical-shaped depression and the panel is then pressed flat by driving the head portion against the panel, thereby making additional material available for forming a tight joint between the element and the sheet metal part.

The spiral depression or groove in the shaft portion can be formed by a threaded groove, namely a continuation of a threaded portion on the shaft of the self-riveting element. In this manner, the depression is made in the same operation as when the thread is formed or cut in the shaft portion. This leads to a considerable cost saving in the manufacture of the self-riveting fastener element and also leads to a clean spiral depression. If the longitudinal ribs are formed on the shaft portion, adjacent the head, to the smaller diameter portion of the shaft during the thread rolling operation, which is preferred, the depression or groove can be readily deformed during the thread rolling operation, such that all threads end in the depression. Alternatively, however, it is possible for the ribs to be formed after the thread rolling operation in a separate step, for example, also in a thread rolling operation. In this case, the depression would be divided into several sections by the ribs. Further, the relieved portion between the ribs extending along the shaft should not extend into the depression to avoid interference with the deformation of the panel into the depression. An exception would apply where the self-riveting elements are used for attachment of an electrical terminal. In that case, the ribs could produce a desirable kerfing effect in the opening of the terminal, which could be beneficial to creating a good electrical contact.

The spiral depression may represent one or two threads and may also be in the form of thread sections, especially where the depression is fashioned as a multiple-start threading, which would be useful for the rivetable element of this invention. The spiral depression or groove has yet another advantage as compared to a circular radial groove. Following installation after extended use, additional torque may be required to remove the nut from the shank portion of the stud because of contamination or corrosion. Such elevated torque, however, will result in forcing the riveting element against the sheet metal part due to the spiral shape of the depression, such that increased torque resistance is provided. Although a spiral groove is preferred for the reasons set forth above, it is also possible to utilize a circular groove or depression wherein the pitch of the depression is zero degrees. This form may be preferred wherein the shaft portion of the self-riveting element is unthreaded, such as an axle journal. The depression or groove should, however, be spaced from the underside of the head, as described above.

As will be understood, the area of the enclosed fields or pockets relative to the contact area, may be selected for optimal torque resistance. Thus, it is possible to use the self-riveting element of this invention in conjunction with softer metals, including aluminum alloy panels, which are being used increasingly in automotive applications. In such applications, the material of the self-riveting element may be selected to avoid galvanic corrosion, wherein the self-riveting element may be formed of an aluminum alloy.

As described, the die member utilized for assembly of the self-riveting element of this invention includes a bore which receives the shank or barrel portion of the fastener and the opening is preferably crowned to deform panel metal into the confined fields or pockets in the head portion of the element. As will be understood, the bottom surface of the groove in the underside of the head portion will depend upon the shape of the die used. Further, the self-riveting element may be a male fastening element, such as a screw or bolt, or a female element, such as a nut, wherein the shaft portion is replaced by an annular barrel portion.

The method of this invention thus includes forming a hole in the sheet metal part by punching, drilling or the like; inserting the shaft or barrel portion of the self-riveting element through the hole in the sheet metal part or panel; then plastically deforming the sheet metal part material in the vicinity of the panel hole to at least partially fill the pockets in the underside of the head and radially inwardly into the groove or depression in the shank or barrel portion of the self-fastening element.

Other advantages and meritorious features will be more fully understood from the following description of the preferred embodiments, the appended claims and the drawings, a brief description of which follows.

DETAILED DESCRIPTION OF THE PREFERRED EMBODIMENTS

Figures 1, 3:
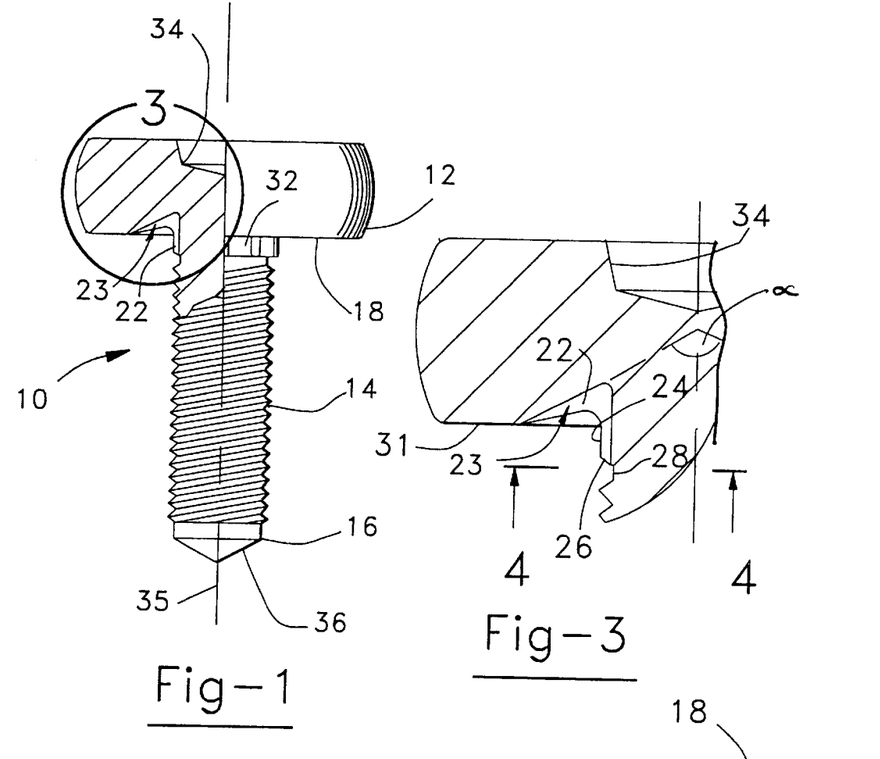
FIG. 1 is a side elevation of one embodiment of the self-riveting element of this invention, which is partially cross-sectioned for clarity.
FIG. 3 is an enlarged cross-sectional partial view of the self-riveting fastening element shown in FIG. 1.
Figure 2:
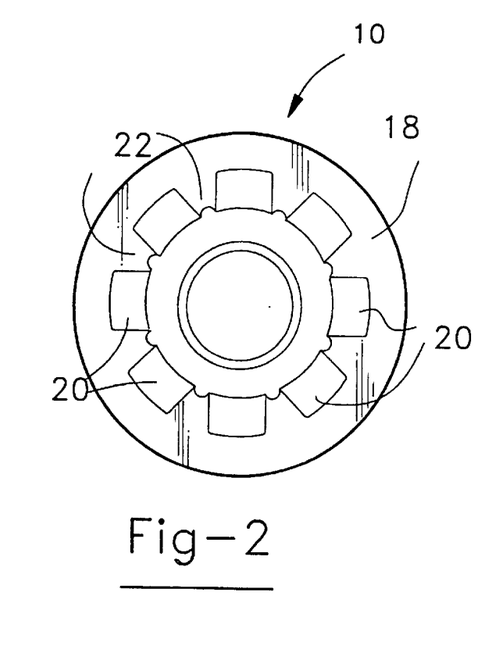
FIG. 2 is an end view of the self-riveting element shown in FIG. 1.
Figure 4:
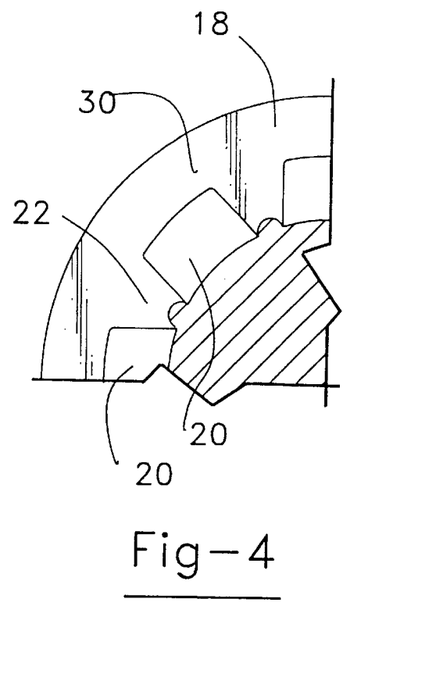
FIG. 4 is a partial cross-sectional end view of FIG. 3 in the direction of view arrows 4—4.

FIG. 1 is a side elevation of one embodiment of the rivetable element 10 of the invention in the form of a threaded bolt having a head portion 12 and a shaft portion 16 to which is externally threaded at 14. As shown in further detail in FIGS. 2, 3 and 4, the underside 18 of the head portion 12 has a concave contact surface including peripherally closed fields or pockets 20 which are partly bounded by ribs 22 which extend radially outwardly from the shaft portion 16 as shown in FIGS. 2 and 4 and which are continuous with rib portions 24 which extend axially along the shaft portion 16 as shown at 24 in FIG. 3. As shown, the ribs 24 extend from the head portion to 26 to depression or groove 28 which in the disclosed embodiment is the first spiral groove of the threaded portion 14 of the shaft.

As shown in FIGS. 2 and 4, the closed fields or pockets 20 are bounded on their radial outer side by surrounding annular peripheral surface 30 of the head, with the ribs 22 defining the radial surface which is continuous with the annular surface 30. The radial inside of the pockets 20 are defined by a cylindrical peripheral surface 32 of the shaft portion. As shown in FIG. 3, the rib portions 22 extend obliquely to the plane 31 defined by the underside of the head portion 12 or backed-off from this plane (31) such that the ribs do not protrude from this backed-off plane adjacent the shaft portion of the self-riveting element. It will be understood, however, that the rib portions 22 may be located in the same plane 31 as the peripheral surface 30. The peripheral surface 30, as well as the surfaces adjacent the shaft 22, form the actual contact surface of the head portion 12. In this embodiment, the closed fields or pockets 20 are generally quadratic or rectangular which, in practice, is a favorable shape. It will be understood, however, that the pockets may be shaped differently within the purview of the present invention. With the embodiment disclosed in FIGS. 2 and 4, the rib portions 22 in the contact area of the underside 18 of the head portion 20 expand radially outwardly as shown in FIGS. 2 and 4. Further, the rib portions 22 extend continuously and without interruption into the outer peripheral surface 30 of the head portion. In the disclosed embodiment, there are eight rib portions 22, with the preferred number of rib portions ranging from between six and eight.

As evident from FIGS. 1 and 3, the pockets or closed fields 20 have their greatest depth measured axially in the direction of axial line 35 (in FIG. 1) adjacent the shaft portion 16. The contact surface on the underside 18 of the head 12 comprises primarily the rib portions 22 and the peripheral outer surface 30. The bottom surfaces of the pockets 20 can be used as a contact surface through deformation of the sheet metal part into the closed fields or pockets. The contact surface is thus relatively large, such that the rivetable element 10 may be used with relatively soft sheet metal parts without concern that a critical surface pressure will result. In the most preferred embodiment, the bottom surfaces of the closed fields are located on a conical shell surface with an inscribed angle of preferably between about 130° to 140°. This taper angle is referred to in FIG. 3 as angle α. Thus, the rivetable element 10 of the embodiment shown in FIGS. 1 to 3 features a centering depression which assures a high-quality, valuable guidance of the element. A conical pilot point 36 at the end of the shaft portion 16 not only provides a female fastener or nut received on the shaft portion with a lead-in, but also guides the self-riveting element in the setting head as it is inserted into the sheet metal part, as described below.

Figure 5:
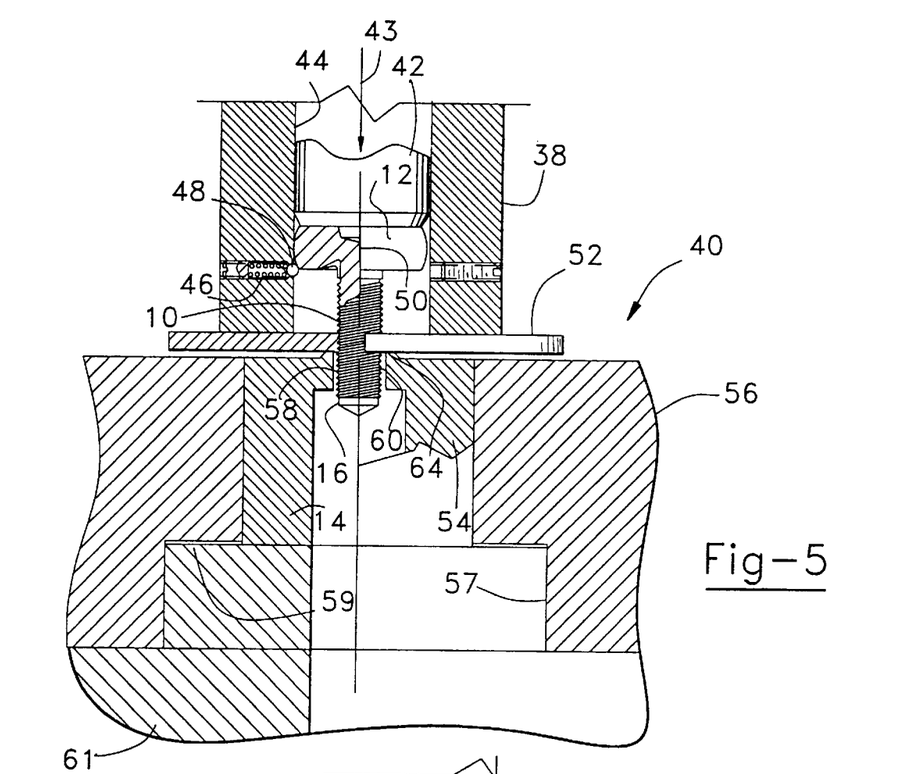
FIG. 5 is a schematic illustration of an installation apparatus or setting head of this invention illustrating the first step of the method of installation of this invention.
Figure 6:
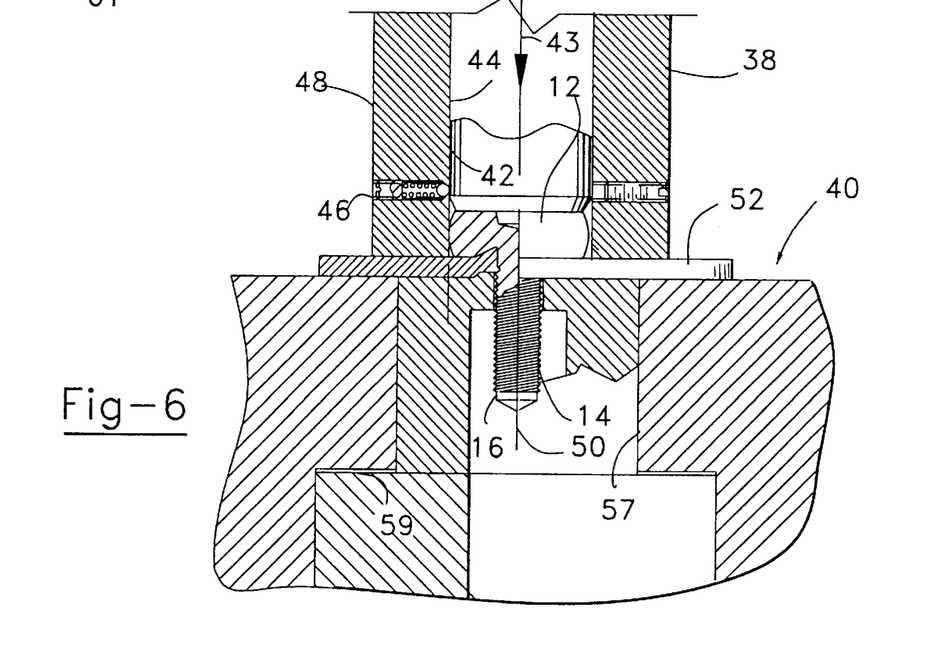
FIG. 6 is a partial cross-sectional view similar to FIG. 5 following installation of the self-riveting fastening element shown in FIG. 5.

The setting or assembly operation is schematically illustrated in FIGS. 5 and 6. The installation tool 40 shown in FIG. 5 includes a setting or installation head 38 having a press joining punch 42 movable in the direction of arrow 43. Arrow 43 indicates the feed direction of the self-riveting element 10 in the installation head. The self-riveting elements 10 are fed individually to the installation head 38. The self-riveting element 10 shown in FIG. 5 proceeds under gravity, compressed air or the joining punch 42 through bore 44 of the installation head until the head portion 12 of the element contacts the ball 48, which is resiliently biased into the bore 44 by spring 46. In practice, three spring biased balls are provided arranged at intervals of 120° around the longitudinal axis 50 of the installation head 38. In the station of FIG. 5, the prepunched sheet metal part 52 into which the element 10 is to be installed is retained between the installation head 38 and a riveting die member 54 of a lower tool 56. The shaft portion 16 of the self-riveting element 10 is provided with a threaded portion 14 which is partially received through the preformed hole in the sheet metal part and through a coaxially aligned cylindrical centering hole 60 in the riveting die 54. The riveting die 54 is releasably retained within a bore 57 of the lower tool 56 and bears against a bolster 59 on a lower press plate 61.

Figures 7, 8:
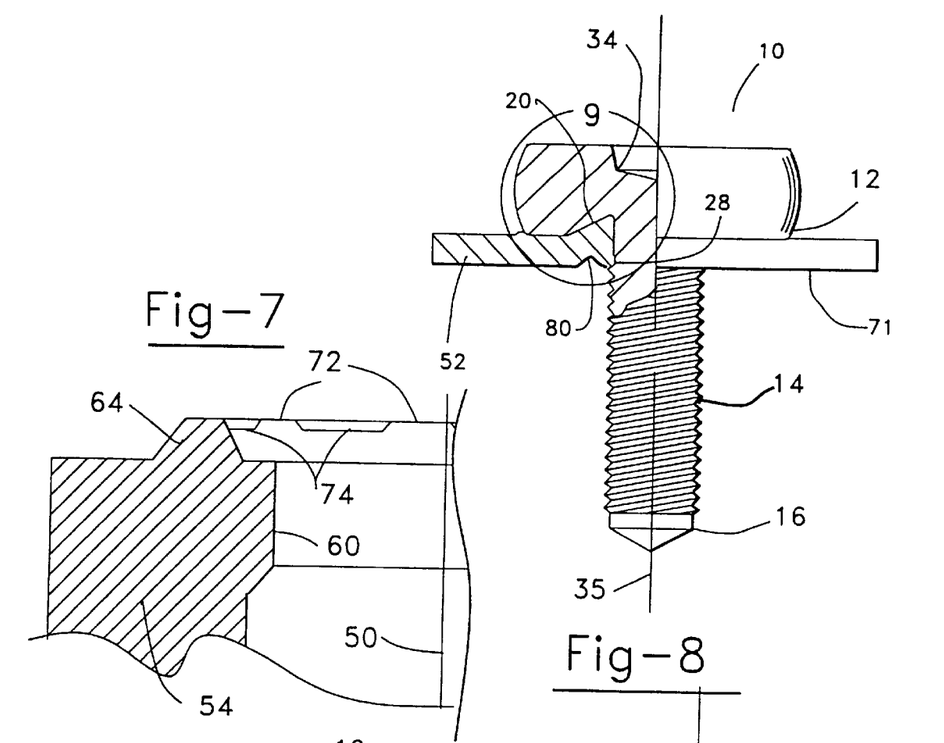
FIG. 7 is a detailed partial cross-sectional side view of the riveting die shown in FIGS. 5 and 6.
FIG. 8 is a side partially cross-sectioned view of the self-riveting fastening element shown in FIGS. 1 to 4 installed in a sheet metal part.

In the subsequent station of the setting operation, the press/joining punch 42 provided in the installation head 38 moves further downwardly, forcing the head portion of the element past the spring loaded balls 48. During this motion, the surrounding crown area 64 shown in FIG. 7 of the riveting die is forced into the material of the sheet metal part deforming the sheet metal into the V-shaped groove 23 which includes the enclosed fields or pockets 20 and into the recess 28, thereby creating a secure, riveted joint between the riveting element 10 and the sheet metal part 52, forming a secure assembly. The preferred embodiment of the riveting die 54 includes a crown area 64 which surrounds the hole 58 as shown in FIG. 7. That is, the annular crown-shaped area of the riveting die defines a wavy end face with peaks 72 and valleys 74 extending in axial direction. In the operation, the relief peaks 72 deform and drive the material of the sheet metal part into the concave fields or pockets 20 in the underside 18 of the head portion of the element, while the valleys 74 make contact with the sheet metal part opposite the ribs 22 which extend radially outwardly, such that there is no pronounced thinning of the sheet metal part in the area of the ribs.

Because the sheet metal material is deformed between the riveting die and the underside of the head portion 12 of the element 10, the sheet metal material is also forced to flow into depression 28, thereby forming the desirable positive joint. Unexpectedly, it is not necessary to angularly align the element 10 on the peaks and valleys of the crown portion 64 because the element will rotate to assume a position in which the peaks 72 of the riveting die 54 are aligned with the concave fields or pockets 20. That is, the necessary alignment takes place through a slight automatic twist of the element during the installation operation.

Figure 9:
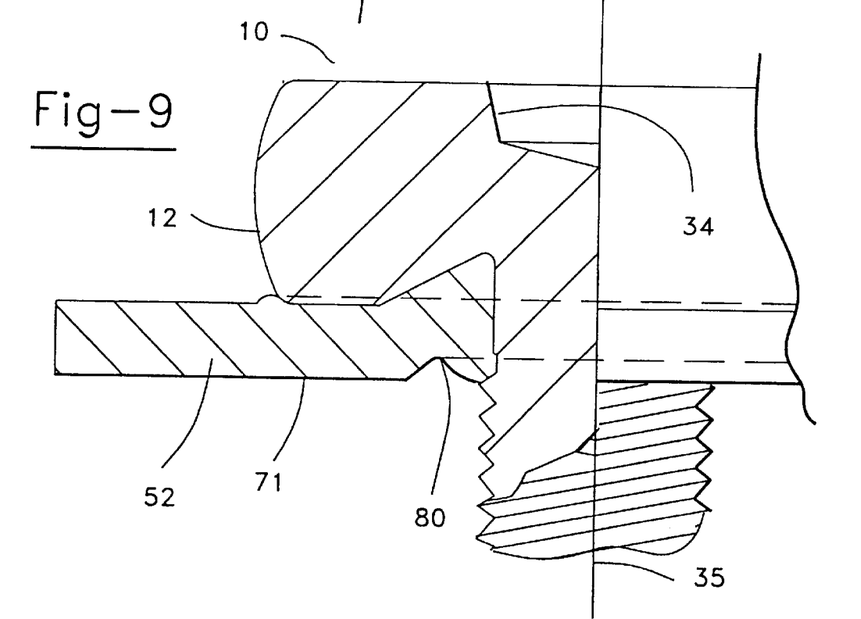
FIG. 9 is an enlarged partial cross-section view of FIG. 8 in the area indicated by reference 9.
Figures 10, 12:
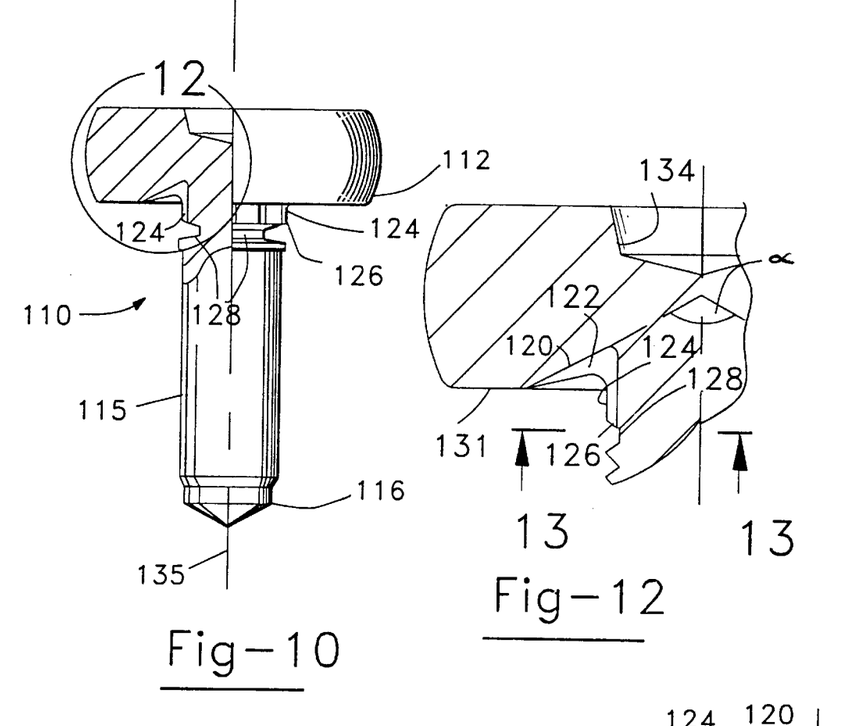
FIG. 10 is a side partially cross-sectioned view similar to FIG. 1 of a second embodiment of the self-riveting fastening element shown in FIG. 1, wherein the shank portion of the riveting element is unthreaded.
FIG. 12 is a partial cross-sectional view of the riveting element shown in FIG. 10.
Figure 11:
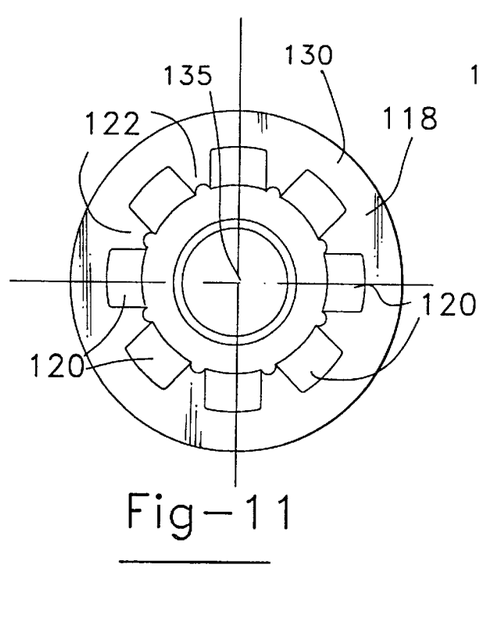
FIG. 11 is an end view of the fastening element shown in FIG. 10.
Figure 13:
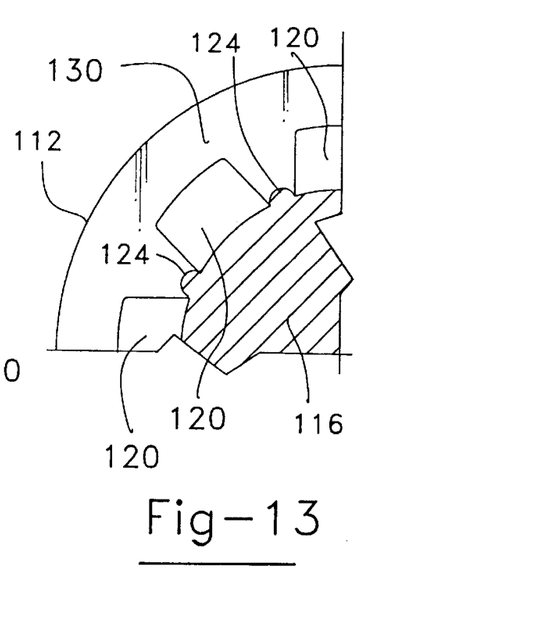
FIG. 13 is an enlarged partially cross-sectional view of FIG. 12.

A groove 80 is formed in the sheet metal part 52 by the crowned area 64 of the die member 54 as shown in FIGS. 8 and 9. This groove 80 may be interrupted, but extends around the shaft portion 16 of the self-riveting fastener on the side of 71 of the sheet metal part away from the head 12 of the fastener as shown in FIGS. 8 and 9. As will be understood, this groove 80 features a wavy bottom surface; however, the peaks of the wavy bottom surface should not protrude beyond the underside 71 of the sheet metal part in order to provide a clean seating of the nut or other object to be attached to the sheet metal part. An exception is where the object to be attached to the sheet metal part is an electrical terminal. In such case, the peak areas of the wavy bottom surface may protrude beyond the underside 71 of the sheet metal part to provide a greater contact surface pressure on the terminal, providing a better electrical contact.

As will be understood, the self-riveting element of this invention may be a female fastener, such as a nut, or any other type of element which may be permanently attached to a sheet metal part, such as a metal panel used by the automotive and appliance industries. FIGS. 10 through 13, for example, illustrate an element 110 in the form of an axle journal. Because of the similarities of the element 110 with the self-riveting element 110 discussed hereinabove, similar reference numbers are used for the element 110 shown in FIGS. 11 and 12 and for all further embodiments described hereinbelow to avoid unnecessary duplication of description.

The differences between the axle journal 110 shown in FIGS. 10 through 13 and the dread bolt 10 are not very significant. Major differences are found in two areas. First, the shaft portion 116 of element 110 includes a cylindrical bearing surface 115, such that the shaft portion is not threaded. It will be understood, however, that the cylindrical bearing surface 115 may include a threaded section in order to tighten the sheet metal part with an appropriate nut or nut and washer arrangement between the head portion 112 and the nut or to secure an interior bushing of the object mounted on the axle journal against axial shifting in a longitudinal direction of the element.

Second, the groove 128 into which the sheet metal is deformed is an annular groove, rather than a spiral groove thread as groove 28 in FIG. 3. The annular or circular groove 128 may thus be considered as a spiral groove with an angle of inclination equal to zero degrees. From FIG. 12, it can be seen that this surrounding groove 128 is arranged approximately an equal distance to the sheet metal thickness from the contact surface 118 of the head 112 and that this distance is substantially greater than similar grooves provided in the fastening elements disclosed in the prior art. It is thus easier to form the groove or depression in the shaft portion than where the groove is located immediately adjacent the head portion 112 as disclosed in the prior art. As described above, however, the groove 128 may be formed as a thread groove as shown at 28 in FIGS. 1 through 4. The groove 128 is formed in this embodiment in the bearing area of the shaft portion adjacent the head portion 112 which may be possible and preferred with the element shown in FIGS. 1 to 9. The positive joint between the element 110 and a sheet metal part are accomplished exactly as described above in regard to FIGS. 8 and 10 with the threaded bolt 10.

Figures 14, 15, 16, 17, 18, 19:
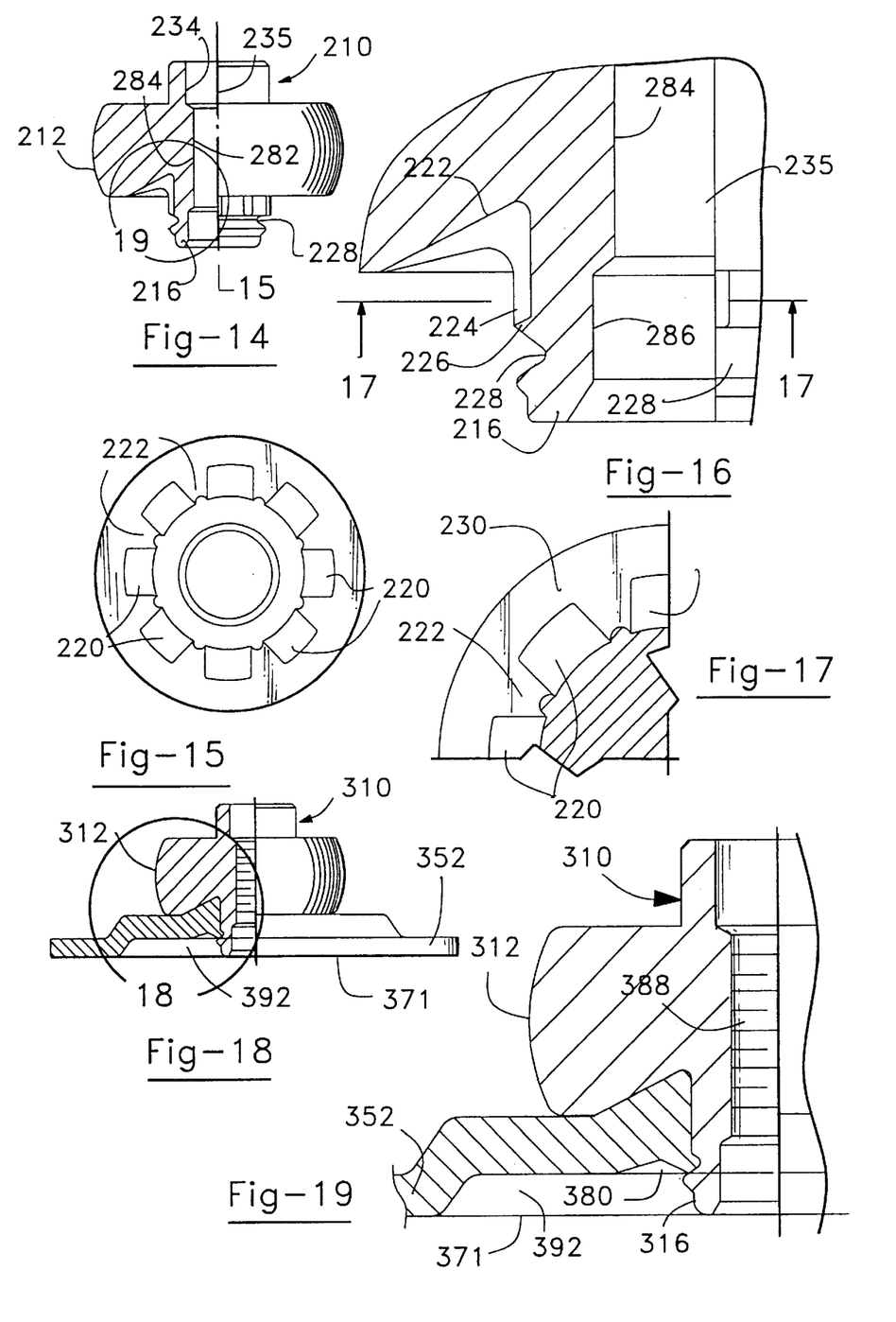
FIG. 14 is a side partially cross-sectioned view of another embodiment of the self-riveting element of this invention in the form of a female element.
FIG. 15 is an end view of the self-riveting element shown in FIG. 14.
FIG. 16 is an enlarged partially cross-sectioned side view of the fastening element shown in FIG. 14.
FIG. 17 is an end partially cross-sectioned view of FIG. 16 in the direction of view arrows 17—17.
FIG. 18 is a partially cross-sectioned side view of another embodiment of the self-riveting element of this invention in the form of a threaded female fastening element installed in a panel.
FIG. 19 is an enlarged view of the fastening element shown in FIG. 18.

The riveting element of this invention may also be in the form of a female element, such as the bearing bushing 210 shown in FIGS. 14 to 17 and the nut fastener 310 shown in FIGS. 18 and 19. The bearing bushing 210 shown in FIGS. 14 to 16 includes an axial through-bore 282 having a cylindrical center portion 282 which provides the bearing surface. In FIG. 14, the upper portion of the bore 282 includes a centering hole 234 having a diameter somewhat larger than the bearing surface 282. The lower portion of the bore 284 includes an enlarged diameter portion 286 which serves to prevent deformation of the shaft portion of the nut due to plastic deformation of the sheet metal part into the fields or pockets 220 and the depression 228, which would result in constriction of the cylindrical bore 282, which would prevent the bearing part from being inserted in the element 210. In this embodiment, the head portion is a radial flange 212 and the shaft portion is an annular barrel portion 216. As set forth above, similar elements are numbered as described above in regard to FIGS. 1 to 13.

As shown in FIGS. 18 and 19, the riveting element 310 may be provided with an internal thread 388, such that the element 310 may be used as a nut fastener following installation in a metal part 352, as shown. This embodiment is very similar to the bearing bushing 210 shown in FIGS. 14 to 17, except that the bore 388 is threaded. The head portion 312 is in the form of a radial flange portion and the shaft portion 316 is a tubular or annular barrel portion which includes a radial depression. It will be understood, however, that the annular barrel portion may also be extended and externally threaded. The threaded bore 388 may then receive a threaded screw (not shown) to attach a further object or element to the metal part 352. When using a female element 310 according to FIGS. 18 and 19, a cup-shaped depression 392 may be preferred in the sheet metal part 352, which allows flush mounting of an object on the underside 371 of the sheet metal part. This cup-shaped depression 392 may be created in the sheet metal part 352 either by a preceding operation as the sheet metal part is being punched or by a special shaping end face of the riveting die shown in FIGS. 5 and 6 as will be understood by those skilled in the art. The female riveting elements shown in FIGS. 14 to 19 may be attached to a metal part by the installation apparatus shown in FIGS. 5 and 6, as described above.

As will now be understood, the self-riveting element and method of installation of this invention may be utilized for a broad range of applications, including male and female elements, fasteners and the like. Further, the several improvements disclosed herein may be used in combination or separately to produce an improved element and fastener assembly. For example, the peripherally closed fields or pockets (20, 120, etc.) provide anti-rotation means for the fastener assembly. Thus, the pockets may not be utilized in a fastener assembly where anti-rotation means is not desired. The method of this invention may then include forming a hole through the panel having a diameter greater than the stud or barrel portion of the elements, supporting the panel on a die assembly having an opening coaxially aligned with the panel hole configured to receive the stud or barrel portion of the fastening element, but having a diameter less than the head or flange portion of the bearing surface, wherein the die member includes a projecting annular lip coaxially aligned with the groove in the riveting element. In the preferred embodiment, the groove 23 is generally V-shaped and extends into the flange or head portion of the element adjacent the barrel or stud portion, as shown in FIG. 3. The method then includes inserting the stud or barrel portion of the element through the panel hole into the die member opening, receiving the head or flange portion bearing surface against the panel, adjacent the panel opening. The method then includes driving the bearing surface of the element against the panel, causing the die member annular lip to substantially simultaneously deform the panel metal into the axial groove and radially into the radial groove of the element. In the most preferred embodiment, the radial groove is the first thread of a threaded portion of the fastener, such as shown in FIG. 3; however, the groove may be annular as shown at 128 in FIG. 10. The element and metal part or panel assembly thus includes a self-riveting element, as disclosed, and a metal part or panel, wherein the stud or barrel portion of the element is received through an opening or hole in the metal part or panel and the panel or metal part is deformed into both the V-shaped annular groove which surrounds the stud or barrel portion and into the radial groove in the stud or barrel portion. In the most preferred embodiment, the panel portion is further and simultaneously deformed into the circumferentially spaced confined fields or pockets, forming a very secure assembly which prevents pull-out and rotation of the self-riveting element in the panel. In the most preferred embodiment, the self-riveting element is a fastener which may be utilized to attach a second element to the panel. In the embodiment 10 disclosed in FIGS. 1 to 4, the fastening element is a male fastening element, such as a screw or bolt 10. In the embodiment 110 shown in FIGS. 10 to 13, the fastening element 110 is an axle journal, wherein the cylindrical stud portion 15 receives a female member having a cylindrical bore, which is attached to the stud portion of the fastening element. In the embodiment 210 disclosed in FIGS. 14 to 17, the fastening element 210 is a bearing bush which receives a male element having a cylindrical surface which is received in the bore 82 of the bushing. Finally, in the embodiment 310 shown in FIGS. 17 and 18, the fastening element is a nut fastener, which receives a screw or bolt for attachment of an element to the panel. Having described the preferred embodiments of the riveting element, method of attachment and assembly of this invention, it will be understood by those skilled in the art that various modifications may be made to the disclosed embodiments within the purview of the appended claims, which follow.

What is claimed is:

1. A method of attaching a fastening element to a plastically deformable metal panel, said method comprising the steps of:

providing a fastening element including a head portion and a generally cylindrical fastener portion integrally joined to the head portion and extending axially from a bottom surface thereof to terminate at a free end, wherein the bottom surface of the head portion is defined by an outer perimeter, an inner perimeter, a planar bearing surface, and a plurality of pockets, wherein the pockets are recessed from the bearing surface into the head portion and extend generally radially along the head portion toward the outer perimeter of the head portion, wherein the pockets do not fully extend to the outer perimeter and are surrounded by the bearing surface, wherein each pocket includes a bottom wall and two side walls, and wherein the fastener portion has a groove spaced between the free end and the bearing surface of the head portion;

providing a plastically deformable metal panel;

forming a generally cylindrical hole through the panel, the hole having a diameter greater than a diameter of the fastener portion;

providing a die assembly including a die member having an upper planar surface defining an opening having a diameter greater than that of the hole, and an annular lip surrounding the opening and extending upwardly from the upper planar surface;

supporting the panel on the die assembly such that the hole is coaxially aligned with the opening and the panel rests on the annular lip;

inserting the fastener portion through the hole and into the opening such that the bearing surface rests against the panel with the annular lip in axial alignment with the pockets; and then driving the bearing surface against the panel, thereby causing the annular lip to deform a portion of the panel into the pockets and into the groove while the bearing surface bears against the panel, such that a secure mechanical interlock is formed between the fastening element and the panel.

2. The method of attaching a fastening element to a metal panel as defined in claim 1 wherein the fastening element is a male threaded member, said method including externally threading the fastener portion of the fastening element to a location adjacent the bottom surface, wherein the groove is defined by a thread adjacent the bottom surface, said method further including deforming the panel radially into the thread adjacent the bottom surface.

3. The method of attaching a fastening element to a metal panel as defined in claim 1 wherein the pockets are generally V-shaped in cross section and include a generally axially extending cylindrical surface, wherein the bottom walls of the pockets extend at an acute angle toward the bearing surface, and wherein the pockets are separated by radial ribs, said method including deforming the panel to substantially fill the V-shaped pockets and engage the ribs, thereby preventing relative rotation between the fastening element and the panel.

4. The method of attaching a fastening element to a metal panel as defined in claim 1 wherein the head portion of the fastening element includes an upper surface having an axial opening opposite and coaxially aligned with the fastener portion, said method comprising locating the fastening element in an installation head having a plunger passage coaxially aligned with the panel opening and having a plunger reciprocating in the plunger passage, wherein the plunger has a locator pin, and said method further comprising locating the locator pin in the opening in the upper surface of the head portion prior to driving the bearing surface against the panel, wherein the locator pin aligns the fastener element relative to the die member.

5. The method as defined in claim 1 wherein the bearing surface is continuous and extends from the inner perimeter to the outer perimeter of the head portion.

6. The method as defined in claim 1 wherein the pockets are partially defined by the inner perimeter of the bottom surface of the head portion.

7. A method of forming a self-riveting element and plastically deformable metal panel, comprising the steps of:
    providing a self-riveting element having a head portion having an upper surface and a bottom surface defined by an outer edge, an inner perimeter, a continuous planar bearing surface extending from the outer edge towards the inner perimeter, and a plurality of pockets extending from the bearing surface to the inner perimeter, the pockets being surrounded by the bearing surface, with each pocket defined by a bottom wall extending between the upper surface and the plane of the bearing surface and two opposed side walls extending transverse from the bottom wall toward the plane of the bearing surface and between the upper surface and the plane of the bearing surface, the fastening element further including a generally cylindrical fastener portion integrally joined with the head portion and extending axially therefrom at a location inward of the inner perimeter and terminating at a free end, with the fastener portion having a radial depression therein that is spaced between the plane of the bearing surface and the free end;
    providing a plastically deformable metal panel;
    forming a hole in the metal panel configured to receive the fastener portion of the element;
    inserting the fastener portion of the element in the panel hole; and
    plastically deforming the material of the metal panel adjacent the panel hole to at least partially fill the pockets of the head portion and substantially simultaneously deforming the panel adjacent the hole into the radial depression on the fastener portion.

8. The method defined in claim 7 further including the steps of:
    providing a die member including an opening configured to receive the fastener portion;
    providing an annular clinching portion on the die member which surrounds the die opening, and projects from the die, and has a wavy end face including peaks and valleys extending in an axial direction; and
    continuing to plastically deform the material by driving the clinching portion into the panel metal while simultaneously rotating the element to locate the peaks opposite the pockets in the head portion.

9. A self-riveting element and panel assembly comprising:
    a plastically deformable metal panel having an opening therethrough;
    a fastening element including a head portion having an upper surface and a bottom surface;
    a fastener portion integrally joined to said head portion and extending axially from said bottom surface to terminate at a free end;
    said bottom surface is defined by an outer edge, an inner perimeter, a continuous planar bearing surface extending from said outer edge toward said inner perimeter, and a plurality of pockets;
    said pockets are recessed from said bearing surface into said head portion and extending to said inner perimeter;
    each said pocket includes a bottom wall, two side walls, and an end wall disposed between said inner perimeter and outer edge with a portion of said bearing surface extending from said end walls to said outer edge;
    said fastener portion including a radial depression spaced from said head portion;
    said fastener portion extending through said panel opening; and
    said panel being deformed into said pockets and against said bearing surface of said head portion and radially into said depression in said fastener portion.

10. The element and panel assembly defined in claim 9 wherein said panel includes an annular indented groove coaxially aligned with said pockets on the side of said panel opposite said element head portion.

11. A self-clinching fastener element comprising:
    a head portion having an upper surface and a bottom surface;
    a generally cylindrical fastener portion integrally joined to said head portion and extending axially from said bottom surface to terminate at a free end;
    wherein said bottom surface of said head portion is defined by an outer edge, an inner perimeter, a continuous planar bearing surface extending from said outer edge to said inner perimeter and a plurality of pockets;
    said pockets are recessed from said bearing surface into said head portion and extend generally radially along said head portion toward said outer edge of said head portion;
    said pockets do not fully extend to said outer edge and are surrounded by said bearing surface; and
    wherein each said pocket includes a bottom wall and two sidewalls.

12. The self-clinching fastener element of claim 11, wherein said fastener element is a male element and said axially projecting fastener portion is an integral stud portion.

13. The self-clinching fastener element of claim 12, wherein said male element is externally threaded to a location adjacent said head portion, but spaced from said head portion a distance equal to approximately the thickness of a panel to which said self-clinching fastener is to be attached.

14. The self-clinching fastener element defined in claim 11 wherein said fastener element is a female fastener element, wherein said fastener portion comprises an annular barrel portion integral with said head portion, and said fastener element includes an axial bore therethrough generally coaxially aligned with the axis of said barrel portion.

15. The self-clinching fastener element defined in claim 14, wherein said bore is internally threaded for receipt of a male fastener.

16. The self-attaching fastener element defined in claim 11, wherein said bottom wall of each of said pockets is inclined inwardly from said bearing surface toward a cylindrical surface adjacent said fastener portion defining a V-shape in cross section.

17. The self-attaching fastener element defined in claim 16, wherein said pockets are separated by ribs extending radially from said cylindrical surface and said ribs having an end surface inclined inwardly toward said cylindrical surface at an angle less than the angle of said bottom walls of said pockets.

18. The fastener element as defined in claim 11 wherein said pockets are partially defined by said inner perimeter of said bottom surface of said head portion.

19. The fastener element as defined in claim 11 wherein said fastener portion has a groove therein that is spaced between the plane of said bearing surface and said free end.

20. An element rivetable to a sheet metal part comprising:
   a head portion having an upper surface and a bottom surface;
   a generally cylindrical fastener portion integrally joined to the head portion and extending axially from said bottom surface to terminate at a free end;
   wherein said bottom surface is defined by an outer perimeter, an inner perimeter, a continuous planar bearing surface extending from said outer perimeter toward said inner perimeter, and a plurality of pockets;
   wherein said pockets are recessed from said bearing surface into said head portion and extend generally radially along said head portion toward said outer perimeter of said head portion;
   wherein each said pocket includes a bottom wall and two side walls;
   wherein each said pocket has an end wall disposed between said inner perimeter and outer perimeter which peripherally closes each said pocket;
   wherein said pockets do not fully extend to said outer perimeter such that a portion of said bearing surface is disposed between said end walls and said outer perimeter;
   a plurality of ribs each including a first end portion extending axially along said shaft and a second end portion disposed on said head and extending radially outwardly from said shaft said ribs being spaced between said pockets; and
   at least one depression spiraling around said shaft portion.

21. The element defined in claim 20 wherein said shaft includes an area of larger diameter adjacent said ribs and at least one depression is contained in said area of larger diameter.

22. The element defined in claim 20 wherein the area of said pockets measured at the plane of said bottom surface of said head portion, as compared to the area of said bearing surface, is selected based upon the materials of said fastener element and the sheet metal part to provide an optimum rotational lockout and noncritical surface pressure.

23. The element defined in claim 20 wherein said rib portions begin along said shaft, extend into said bottom surface of said head portion, flare radially outwardly, and extend without interruption into said bearing surface of said head portion.

24. The element defined in claim 20 wherein the number of ribs are at least six.

25. The element defined in claim 20 wherein said pockets are substantially quadratic at said bottom surface of said head portion.

26. The element defined in claim 20 wherein said bottom wall of said pockets are generally on a conical shell surface with an inscribed angle of generally 130 to 140°.

27. The element defined in claim 20 wherein said upper surface of said head portion includes a centering depression which is coaxial with a longitudinal axis of said element.

28. The element defined in claim 20 wherein said element is in the form of a threaded bolt and said shaft portion is externally threaded.

29. The element defined in claim 20 wherein said depression comprises a spiral thread groove adjacent said head portion.

30. The element defined in claim 20 wherein said shaft portion has a smooth external cylindrical surface providing a bearing surface for receipt of a female bearing element.

31. The element defined in claim 20 wherein said shaft portion includes a centering point having a conical end coincident with a longitudinal axis of said shaft portion.

32. The element defined in claim 20 wherein said element is a self-attaching nut member, wherein said shaft portion is generally tubular and has a bore coincident with an axis of said element extending through said element.

* * * * *